Feb. 18, 1930. R. ADAMS Re. 17,597
MULTIPLE SIZE TONGS
Original Filed Nov. 11, 1924 2 Sheets-Sheet 1
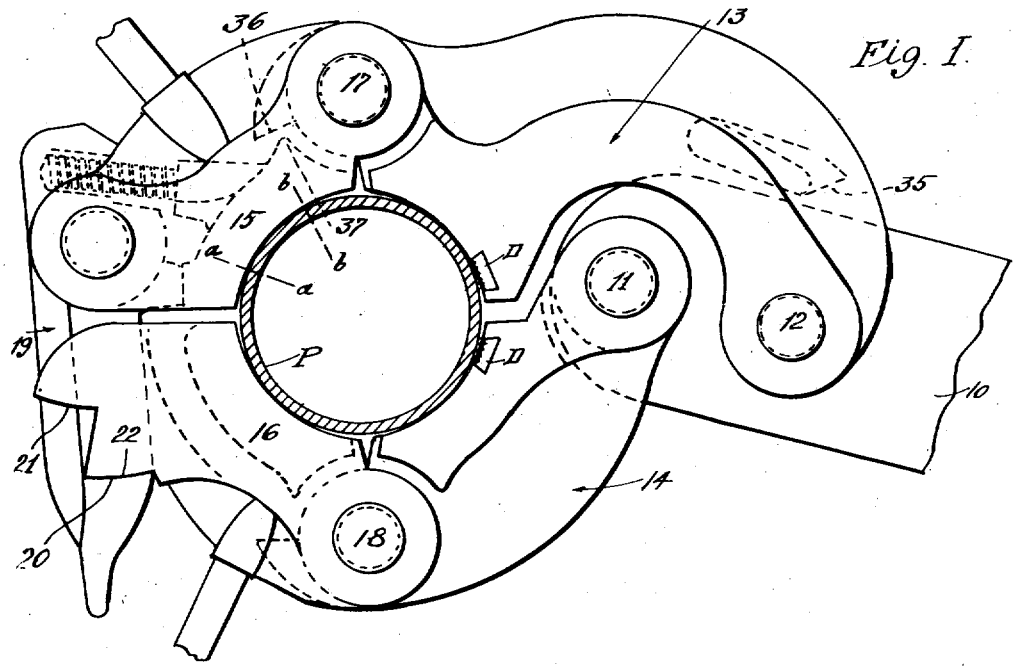
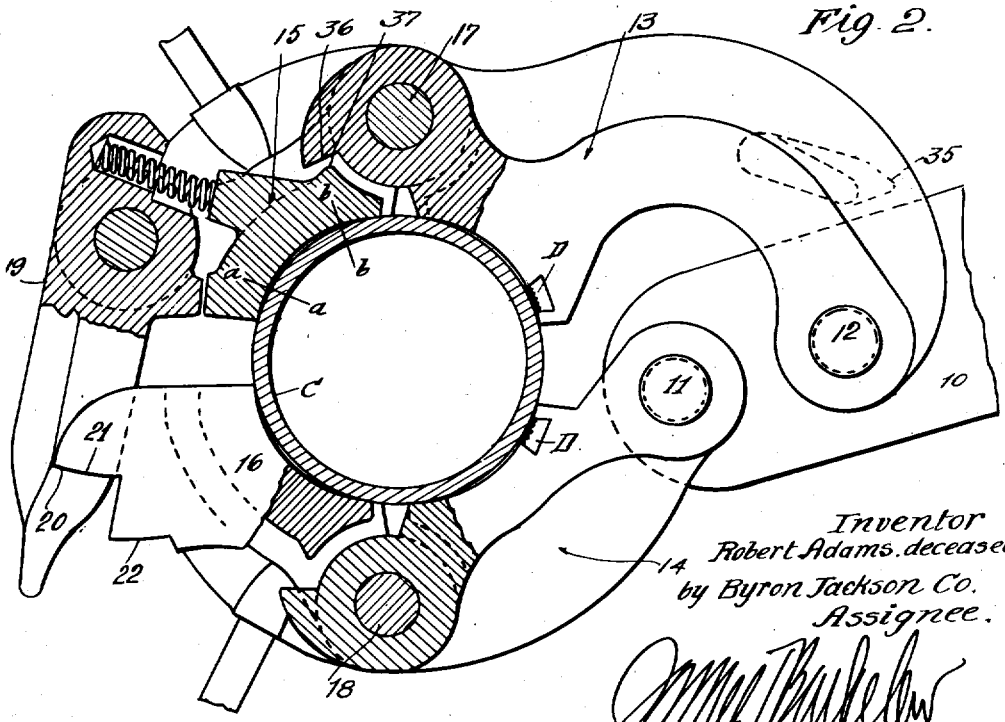
Inventor
Robert Adams, deceased
by Byron Jackson Co.
Assignee.
Attorney.

Feb. 18, 1930. R. ADAMS Re. 17,597

MULTIPLE SIZE TONGS

Original Filed Nov. 11, 1924 2 Sheets-Sheet 2

Inventor.
Robert Adams, deceased
by Byron Jackson Co.
Assignee.

Attorney.

Reissued Feb. 18, 1930

Re. 17,597

UNITED STATES PATENT OFFICE

ROBERT ADAMS, DECEASED, LATE OF LOS ANGELES, CALIFORNIA, BY BYRON JACKSON CO., ASSIGNEE, OF LOS ANGELES, CALIFORNIA

MULTIPLE-SIZE TONGS

Original No. 1,652,551, dated December 13, 1927, Serial No. 749,126, filed November 11, 1924. Application for reissue filed December 10, 1929. Serial No. 413,131.

This invention has to do with tongs that are adaptable to work of different sizes; and the general object of the invention is to make such tongs have a work gripping or contacting surface that will give a good, broad and comparatively flat engagement with different sizes of work.

Heretofore, in tongs that have been adjustable or, in some manner, applicable to take pipe or other work of different sizes, the work engaging members have been so formed on their work engaging surfaces that it has been impossible to obtain a good contact with more than one size of pipe. For instance, in tongs where the work is encircled by several interconnected jaws or segments; those jaws or segments have commonly been formed or bored to have arcuate surfaces of a certain diameter, and that would accordingly fit flatly only upon a single diameter of work. On work of all other diameters there has thus been practically only a point or line of contact of each segment or jaw with the work.

This invention comprises primarily the formation of work engaging surfaces in such a manner as to give a comparatively broad and flat engagement with any size of work to which the tongs are adapted. In explaining the invention, in the following description, it is applied specifically to that type of tongs known as the "Wilson tongs", which are largely used in oil well work. Thus the invention is explained as applied to such tongs as are set out in the patents to Elihu C. Wilson, Patent No. 1,561,963, dated November 17, 1925, and Patent No. 1,575,141, dated March 3, 1926, and the patent to Robert Adams, Patent No. 1,647,977, dated November 8, 1927. But it will be understood that the explanation of the invention as applied to such specific type of tongs is not to be taken as a limitation upon the invention itself.

For the purposes of the description, there is shown in the accompanying drawings such tongs with the invention applied thereto, and in these drawings:

Figure 1 is a plan showing the tongs closed about a smaller pipe;

Fig. 2 is a plan, with parts in section, showing the tongs closed about a larger pipe;

Figure 3:
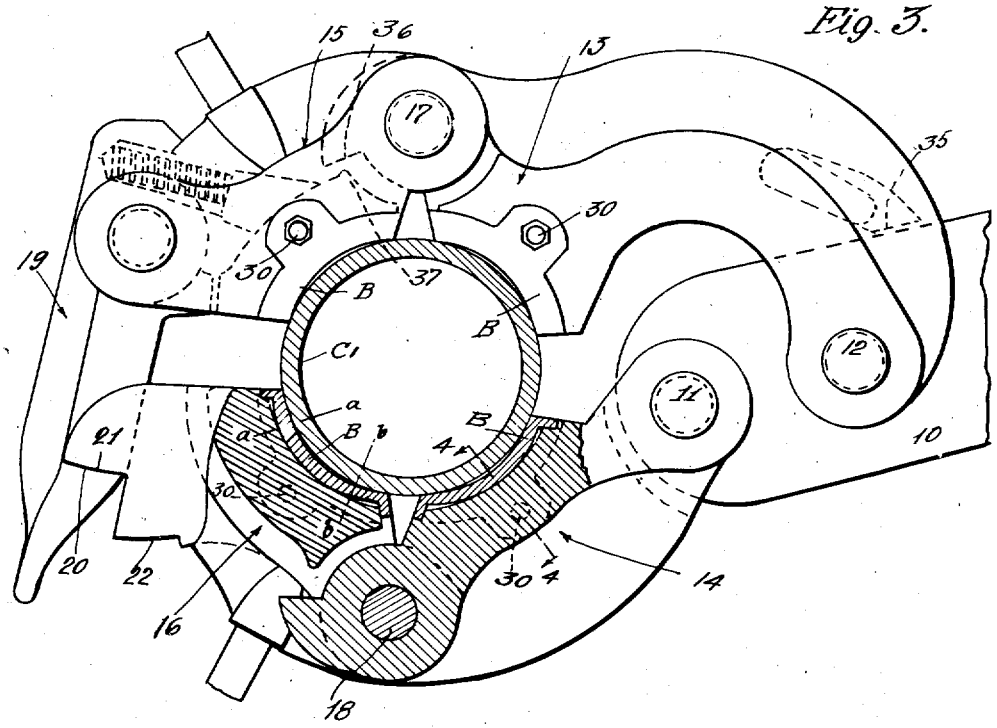
Fig. 3 is a plan, with parts in section, showing the tongs equipped with reducing bushings, and applied to the larger size of pipe that it will take when equipped with such bushings.

The specific type of tongs shown in the drawings involve a lever handle 10 with a plurality of pipe encircling segments or jaws, so pivoted to the handle that movement of the handle constricts the jaws about the work. Thus, for instance, the handle has two pivots at 11 and 12, to which the jaws 13 and 14 are connected, and these two jaws 13 and 14 carry two outer jaws 15 and 16 pivoted to them at pivots 17 and 18. One of the outer jaws carries the spring pressed latch 19, whose latching shoulder 20 is adapted to engage either of two lug shoulders 21 and 22 on the other outer jaw 16. By the latch thus engaging either of the shoulders, and also by movement of handle 10, the four jaws may surround either a small sized pipe P, as shown in Fig. 1, or a larger sized pipe or the collar C as shown in Fig. 2.

In the preferred practical form of the invention, the jaws each have an inner pipe engaging surface of a plurality of curvatures. Thus, in the particular tongs illustrated, where the tongs are made to be applicable to two different sizes of work, each jaw is provided with pipe engaging surfaces of two curvatures. Thus, for instance as on the jaw 15, it will be noted that the curvature between the two dash lines *a—a* and *b—b*, is a curvature corresponding to that of the smaller pipe P, whereas the curvature from line *a—a* and line *b—b* to the ends of the jaw is a curvature corresponding to that of the larger size pipe or collar C. These two curvatures are, in practice, formed as follows: The tongs are first set in the position shown in Fig. 2, that is, in a position to encircle the larger size pipe or collar, and then the inner faces of the jaws are bored out to a diameter equal to that of the larger size pipe or collar. In this condition the jaws have but a single curvature, the jaws having curved faces that would then fit flatly upon the larger size pipe or collar throughout the lengths of the jaws. Then the tongs are put into the position shown in Fig. 1, that being the position they assume when surrounding the smaller size pipe P. In this position they are bored to a diameter equal to the smaller size pipe, but in so boring it will be noted that the cutting tool does not cut into each jaw throughout the length of its face, but only cuts into the central part of each jaw so that there is then in the center of each jaw a curved face of a curvature corresponding to that of the smaller size pipe, leaving intact the two end faces of each jaw that have curvatures corresponding to the curvature of the larger size pipe or collar. Thus, when the tongs are applied to the smaller size pipe, the jaws each seat on the pipe flatly throughout those portions of their faces that are of the smaller diameter curvature; while, when the tongs are applied to the larger size pipe or collar, they contact and seat flatly throughout those portions that have curvatures on the larger diameter.

It will, of course, be readily understood that the scheme of curvatures here described is not limited necessarily to curvatures of only two diameters, as it will be obvious that in tongs applicable to three or more different diameters of work, the jaw faces may be bored or otherwise surfaced to have curvatures on those three or more different diameters. However, as the invention is here described as applied to a tongs applicable to two different sizes of work, the jaws are shown with two different curvatures.

Figure 4:
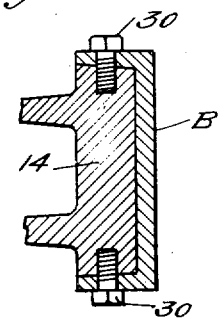
Fig. 4 is a detailed section on line 4—4 of Fig. 3.
Figure 5:
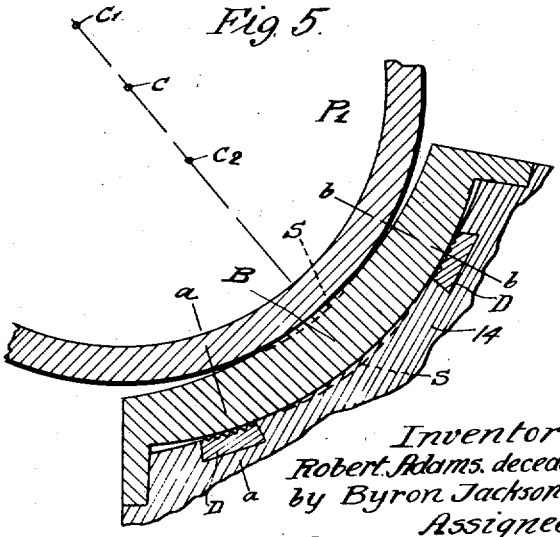
Fig. 5 is a more or less diagrammatic section showing more clearly the formation of the work engaging surfaces.

The tongs shown in these drawings may be adapted to take other different sizes of work by the use of bushings B such as shown in Figs. 3 and 4. These bushings may be made easily attachable to and detachable from the tongs as, for instance, by being held in place by cap screws 30, and they are curved at their back faces to seat back against the face curvatures of the jaws. For instance, a simple way of making the bushings is to make the curvature of their back faces the same as the smaller diameter curvature of the jaws. The front or inner faces of those bushings may also have surfaces of multiple curvature, in this case faces of double curvature. For instance, in these bushings the curvature between the two lines *a—a* and *b—b* may be the curvature to take a smaller size pipe $P^1$ as is indicated in Fig. 5, while the curvature between said lines *a—a* and *b—b* and the ends of the bushings may be such as to take a larger size pipe or a collar $C^1$, as is shown in Fig. 3. The bushings thus enable the tongs to be used on pipes or collars of various different sizes, and, of course, several sets of bushings of different thicknesses may be applied and used in connection with a given set of tongs. But another advantage of the bushings is in this: that by the use of such bushings the tongs may be made to accurately fit upon a pipe of a diameter very slightly different from the pipe which the tongs will fit without the bushings. In a tongs of the kind here illustrated, it is advantageous to have the two lug shoulders 21 and 22 spaced apart by a substantial distance in order to make the latch shoulder always drop over and engage with the correct lug shoulder when the tongs are applied to a pipe without the necessity of the correct shoulder being selected by the operator. Tongs of the character herein shown are made to be automatic in their application to a pipe, as is set out in the Adams patent hereinbefore mentioned. In such operation of the tongs the handle 10 is thrown around in the direction indicated by the arrow in Fig. 1, until it contacts with the stop 35 on jaw 13. By holding the handle in this position, jaw 13 is prevented from backing away from the pipe and the stop action of stop lug 36 on jaw 13 and lug 37 on jaw 15 limits the amount by which jaw 15 can back away from the pipe. With the parts in this position it is only necessary to swing the jaw 16 around to closing position on the pipe, and the latch shoulder 20 will then drop over lug shoulder 21 if the tongs are being applied to a larger sized pipe or collar; or the latch shoulder will go on and drop over lug shoulder 22 if the tongs are being applied to the smaller sized pipe. In these operations it is, of course, necessary that the two lug shoulders 21 and 22 be kept far enough apart that the latch shoulder will never have the opportunity of dropping over lug shoulder 23 when the tongs are being applied to the larger size pipe or collar. Consequently, in a tongs of this type, it may be somewhat difficult to have the tongs applicable to pipes of different sizes where the difference in size is comparatively slight. But by the use of bushings it will be seen that, for instance, the larger size pipe or collar which may betaken by the tongs equipped with bushings may be very nearly the size of the smaller size pipe that may be taken by the tongs not equipped with bushings; and that in each case the tongs makes very good contact with the pipe or collar, as the case may be.

Fig. 5 shows, more or less diagrammatically, the different curvatures of the work gripping surfaces. Here the difference in curvatures is made clear and it is made clear how only surfaces of one curvature will contact and grip with a pipe of a given diameter, and that a flat contact is had over a considerable area. In Fig. 5 a smaller size pipe is shown and it will be seen that it is gripped over the area between the lines *a—a* and *b—b*.

This area on the bushing B (and likewise the corresponding area on the jaw) has a cylindric curvature with a center at the point *c*. The surfaces at the ends of the bushing and jaw are of a cylindric curvature whose center is at the point $c^1$. The small sized pipe will engage only the curved surface between lines *a—a* and *b—b*. Similarly the larger sized pipe will engage only the curved surfaces outside those two lines, clearing the curved surface of shorter radius. This is because the short radius surface lies outside the curvature (prolonged) of the large radius surfaces, as will readily be seen from the drawings.

Figure 6:
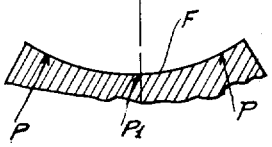
Fig. 6 is a diagram showing a modified form of work engaging face.

If it were desired to make these surfaces adaptable to another and still smaller size of pipe, a surface of another curvature would, for instance, be made as indicated by the dotted lines *s* having a center, for instance, at the point $c^2$. Carried to an ultimate conclusion, this provision of surfaces of different curvatures on the faces of the jaws or segments amounts to the pipe gripping face of any one jaw having a varying curvature. In other words, it amounts to the jaw, for instance, having a face of a curvature that varies from point to point along its length. If the curvature from end to end of the jaw constantly varied, in strict theory there would be, of course, but a line of contact with each individual size of pipe. But, if the variation in curvature is not very great, in practice, due to resilient compressibility of the materials of the jaws and pipe, this theoretical line of contact is expanded into a small surface of contact. Thus, for instance, the jaw may be equipped with an inner face, such as illustrated in Fig. 6. Here, for instance, the inner face F may be parabolic in contour and the curvature, say at the points *p*, may be on a diameter of 6″, while the curvature at the center point $p^1$ may be, for instance, on a diameter of 5″. A pipe of 6″ diameter would theoretically contact at the two points *p*, while a pipe of 5″ diameter would contact at the point $p^1$; but the variation in curvature being small, the theoretic lines of contact are expanded into small areas of contact by reason of resilient compressibility of the materials.

However, the specifically preferred form of gripping surface that involves a plurality of surfaces of different curvature, the curvature of each individual surface being uniform; as has been first explained in this description. In such an arrangement, if it is desired to use toothed dies, such as are commonly inset into tong jaws, those toothed dies are inset into one or more of the jaws at the points of change of curvature in their surfaces. This, for instance, is illustrated at D in Figs. 1 and 5. In such position it will be readily understood that the teeth of the dies will then engage work of either size.

What is claimed is:

1. In a tongs, the combination of a plurality of work gripping jaws adapted collectively to surround and grip work of different sizes, the jaws having substantially similar work engaging faces and each jaw having work engaging surfaces of two different curvatures, and means selectively to interconnect the jaws either in position such that their surfaces of lesser curvature lie substantially in a single circular periphery or in position such that their surfaces of greater curvature lie substantially in a single smaller circular periphery.

2. In a tongs, the combination of a plurality of work gripping jaws adapted collectively to surround and grip work of different sizes, the jaws having substantially similar work engaging faces and each jaw having work engaging surfaces of two different circular curvatures, the surface of greater curvature lying outside the curvature, prolonged, of the surface of lesser curvature, and means selectively to interconnect the jaws either in position such that their surfaces of lesser curvature lie substantially in a single circular periphery or in position such that their surfaces of greater curvature lie substantially in a single smaller circular periphery.

3. In a tongs, the combination of a plurality of work gripping jaws adapted collectively to surround and grip work of different sizes, the jaws having substantially similar work engaging faces and each jaw having work engaging surfaces of two different curvatures, and means selectively to interconnect the jaws either in position such that their surfaces of lesser curvature lie substantially in a single circular periphery or in position such that their surfaces of greater curvature lie substantially in a single smaller circular periphery, said means embodying a multiple-step latch device mounted upon and operating between adjacent ends of two adjacent jaws.

4. In a tongs, the combination of a plurality of work gripping jaws adapted collectively to surround and grip work of different sizes, the jaws having substantially similar work engaging faces and each jaw having work engaging surfaces of two different circular curvatures, the surface of greater curvature lying outside the curvature, prolonged, of the surface of lesser curvature, and means selectively to interconnect the jaws either in position such that their surfaces of lesser curvature lie substantially in a single circular periphery or in position such that their surfaces of greater curvature lie substantially in a single smaller circular periphery, said means embodying a multiple step latch device mounted upon and operating between adjacent ends of two adjacent jaws.

5. In a tongs, the combination of a plurality of work gripping jaws adapted collectively to surround and grip work of different sizes, one of said jaws having a work-engaging surface of a plurality of different curvatures, and of which a surface of greater curvature lies outside the curvature, prolonged, of a surface of lesser curvature; and means selectively to interconnect the jaws either in position that such surface of lesser curvature lies substantially in a single circular periphery with the work engaging surfaces of the other jaws, or in a position that such surface of greater curvature lies substantially in a single smaller circular periphery with the work engaging surfaces of the other jaws.

6. In a tongs, the combination of a plurality of work gripping jaws adapted collectively to surround and grip work of different sizes, one of said jaws having a work engaging surface of a plurality of different curvatures, and of which a surface of greater curvature lies outside the curvature, prolonged, of a surface of lesser curvature; and means selectively to interconnect the jaws either in position that such surface of lesser curvature lies substantially in a single circular periphery with the work engaging surfaces of the other jaws, or in a position that such surface of greater curvature lies substantially in a single smaller circular periphery with the work engaging surfaces of the other jaws, said means embodying a multiple step latch device mounted upon and operating between adjacent ends of two adjacent jaws and having latch steps equal in number to the number of said different work engaging curvatures.

Signed this 21st day of October, 1929.

[L. S.] BYRON JACKSON CO.,
By W. W. WILSON,
*Vice President,*
*For Robert Adams, Deceased, and as Assignee of the Entire Right, Title, and Interest.*